Figure 1:
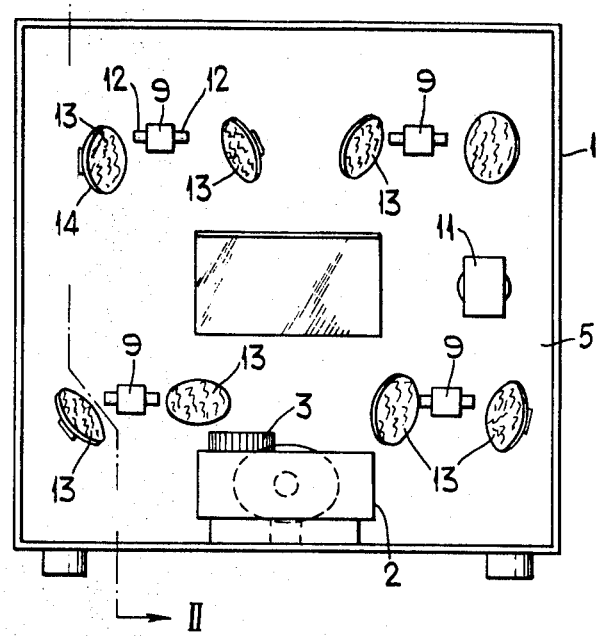

United States Patent

[11] 3,609,339

| [72] | Inventor | Victor S. Smith<br>Channing House, Wargrave, Berkshire, England |
|---|---|---|
| [21] | Appl. No. | 813,953 |
| [22] | Filed | Apr. 7, 1969 |
| [45] | Patented | Sept. 28, 1971 |
| [32] | Priority | Apr. 10, 1968 |
| [33] | | Great Britain |
| [31] | | 17410/68 |

[54] DISPLAY SYSTEM
3 Claims, 5 Drawing Figs.

[52] U.S. Cl. ...................................................... 240/3.1, 353/1
[51] Int. Cl. ...................................................... F21p 5/04
[50] Field of Search ........................................... 350/4; 40/106.53, 130, 132; 353/1; 240/3.1, 10.1

[56] References Cited
UNITED STATES PATENTS

| 1,878,331 | 9/1932 | Savage .......................... | 240/49 |
| 3,119,565 | 1/1964 | Nottingham .................. | 353/1 X |
| 3,242,330 | 3/1966 | Schoffer ....................... | 240/3.1 |
| 3,318,187 | 5/1967 | Prohaska ...................... | 350/4 |
| 3,366,786 | 1/1968 | Delano ......................... | 240/3.1 |

FOREIGN PATENTS

| 1,257,721 | 2/1961 | France .......................... | 353/1 |
| 256,938 | 3/1927 | Great Britain ................ | 240/3.1 |

*Primary Examiner*—Harry N. Haroian
*Attorney*—James H. Littlepage

ABSTRACT: A stationary light source projects light onto a translucent screen via two laterally spaced rotating reflectors, each having a reflective surface of crinkled metallized plastic.

PATENTED SEP 28 1971 3,609,339

SHEET 1 OF 2

INVENTOR
Victor S. Smith.
by James H. Littlepage
Attorney.

DISPLAY SYSTEM

The present invention relates to a display system which may be used for advertising purposes or for a variety of applications where an unusual and attractive visible background may be desired.

In general terms the invention relates to a device by means of which an attractively colored image, which in the preferred form is continuously moving and changing, may be projected on to a screen. Such a screen can be used for advertising, for example projected images of products or of letters or alphanumerics written words, the colored image being used as a background. The screen may also be used as a background for example for the introduction to cinematograph films or television programs where the details of the cast or the introducer 3 IMAGE MAY APPEAR AGAINST THE BACKGROUND PROVIDED BY THE DEVICE.

According to the invention there is provided a device for projecting a visual image on to a screen comprising a light source and a reflector arranged in an optical path to reflect light from the source on to the screen, the reflector comprising randomly oriented reflecting surfaces of colored reflecting metallized plastics material.

Preferably the reflector comprises deformable colored reflecting material crinkled to produce randomly oriented reflecting surfaces.

A plurality of reflectors may be arranged so that the reflected light images at least partly overlap on the screen. They may be arranged to be illuminated from a common light source. The deformable material in one or more of the reflectors may be of uniform coloring or it may be a composite of deformable materials of different color.

By "colored reflecting material" is meant material which when held in the path of light from a white source will reflect only light of its particular color. The preferred material is colored metallized Melinex. This is currently sold under the Registered Trade Mark Vapcolex.

However, many alternative deformable colored reflecting materials may be used such as a normally reflective deformable metallized plastics material coated with a layer of transparent colored material. Colored Vapcolex is only an example of a metallized plastics material coated with a colored transparent varnish. The reflector may further include for example, aluminum or other reflective metal foil. This may be anodized to provide the necessary color or coated with varnish or gold leaf.

Instead of using a deformable material to provide the randomly oriented surfaces, an equivalent result may be produced, less conveniently, by producing the surfaces in any suitable base material by moulding or cutting and, if necessary, treating the surfaces so produced to make them of colored reflecting metallized plastics material. The reflector may be molded at least partly from reflective colored plastics material such as methyl methacrylate in a manner similar to the production of moldings for motor car rear lamps or reflectors. The resultant molding may be covered in part by other colored or uncolored reflecting material.

One or more of the reflectors may be at least partly composed of uncolored deformable reflecting material and again suitable material is uncolored metallized Melinex.

The device may include one or more projectors for superimposing focused photographic images on to the said screen against a background of the said changing visual images. The projectors may include a slide projector provided with an automatic slide changer and/or a cinematograph projector. Preferably there are included means for imparting a blurred edge to the superimposed image from the projector or at least some of them and for means for fading in and fading out the projected images therefrom. The colored images may be similarly faded in and out. This may be carried out by means of a thyristor arranged in the energizing circuit of the projector bulb or light source as is well known.

A mirror may be arranged in the optical path of the said projector or at least some of the projectors and the mirror may be provided with means for causing periodic movement thereto of a kind imparting distortion to the projected photographic image. The mirror may be of deformable material and arranged to be vibrated. For example the mirror material may be mounted over a loudspeaker cone for vibration thereby. The mirror material may be metallized Melinex. A plane mirror may be used to bend the beam so as to allow the focal length of a projector to be accommodated in a confined housing.

One or more of the reflectors may have one or more natural or artificial jewels and/or sequins on its reflecting surface. Chips of broken glass or transparent plastics may also be used.

In accordance with a preferred form of the invention there is provided a device as described above for projecting a continuously moving and changing visual image on to a screen wherein the reflector or one or more of the reflectors is mounted for continuous movement and provided with drive means for effecting such movement.

The reflector or reflectors are preferably arranged for continuous rotation. However, one or more reflectors may be arranged for vibration or reciprocation. Various kinds of oscillatory movement can be used. The word "continuous" whether in respect of movement in general or of rotation is intended to include the case where one or more reflectors may be programmed to stop for certain periods and then to resume movement.

Deformable reflecting material in a reflector may be attached to an inflatable support, means being provided for varying the degree of inflation to cause variations in the deformity of the reflecting material.

A second reflector may be arranged in the optical path for continuous movement out of phase with the first reflector, the second reflector having randomly oriented reflecting surfaces. For example an elongate structure composed of crinkled metallized Melinex or tin foil or the like of narrower width than the width of the first reflector may be arranged in the light path either upstream or downstream of the main reflector for rotation, e.g. about an axis at an angle to the axis of rotation of the main reflector.

A preferred form of the invention comprises a housing provided with a translucent said screen and within which the remaining components are mounted and arranged so that the various images are projected (in operation) on to the inside surface of the screen and rendered visible to an outside viewer. However, the invention in its broad sense does not necessarily include a screen since the user of the invention may have a particular object in mind such as a theater backdrop for use as the screen.

In a preferred form of reflector the colored reflecting material is attached to or otherwise integral with a rigid base plate provided with an axle extending out of the plane thereof and connected for rotation to an electric motor. The axle may be offset from the perpendicular with respect to the plane of the base plate. The degree of off-settedness may be arranged to be continuously varied. The reflectors or one or more of them may each be provided with a separate fractional horsepower electric motor.

A plurality of reflectors may be arranged to rotate at different speeds. They may be arranged to rotate with a continuously changing reflection angle. Preferably the orbit of the reflected image resulting from the changing reflection angle is different for different reflectors.

Figure 3:
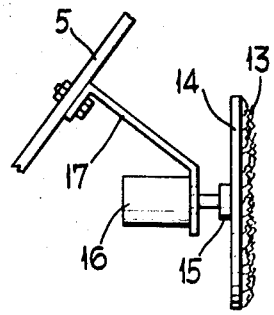
Figure 2:
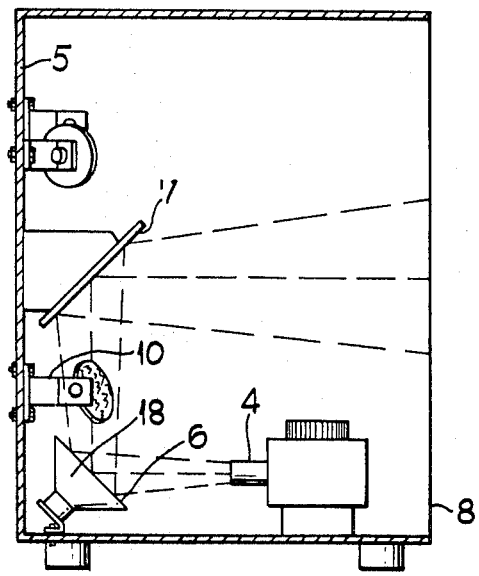
Figure 4:
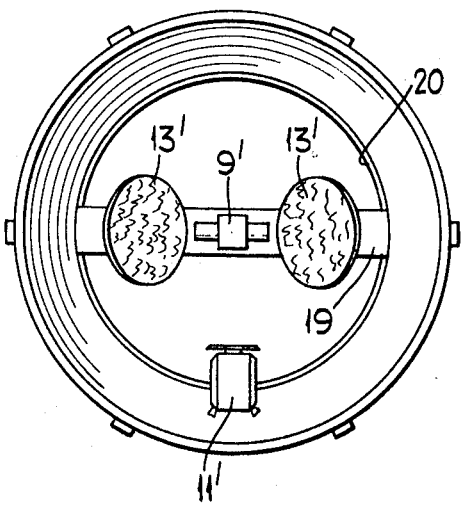
Figure 5:
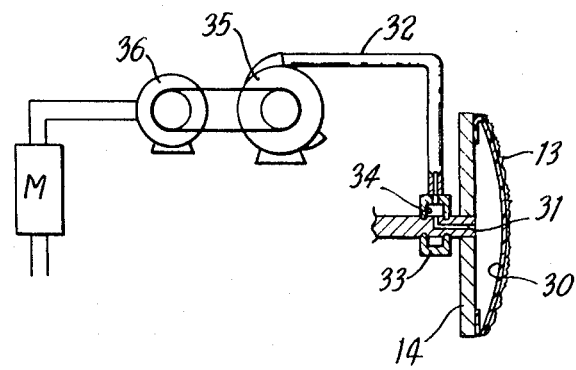

Preferred embodiments of the invention are hereafter more particularly described with reference to the accompanying drawings, in which:

FIG. 1 is a front elevational view with the front face or screen removed of an embodiment of the invention suitable for use in advertising, FIG. 2 is a side sectional view along the line II—II of FIG. 1, FIG. 3 is a magnifying side elevation of one of the rotating reflectors, FIG. 4 is a front perspective view of a second embodiment, with the screen removed, FIG. 5 illustrates a pulsating reflector.

Referring to FIG. 1 there is shown a cabinet 1 in which is arranged a slide projector 2 of the type having a magazine 3 in the form of a rotating turret, and a lens 4. The projector 2 is mounted near the floor of the cabinet 1 and directed towards its rear wall 5. In the path of the projected beam is arranged a first normally planar reflecting surface which is arranged to reflect the beam upwardly as shown by the broken lines to a planar second reflecting surface 7 which projects the images of the slides back to a translucent screen 8 which forms the whole front wall of the cabinet 1. The screen is of a kind which makes the projected images visible to an outside viewer.

Convention means (not shown) may be provided for fading the successive images in and out and preferably means such as an irregular frame positioned at an out-of-focus point is provided for forming a blurred edge to the projected images.

A cinematograph projector may be used if desired, instead of a slide projector.

Four stationary light sources 9 are provided in convenient positions in the cabinet, and mounted upon supports 10 to the rear wall 5. Each light source 9 is preferably of the high intensity quartz-halogen type, e.g. as used in motor car headlamps, and may be run from a low voltage alternating source through a transformer 11, also mounted on the rear wall 5. They can, however, be mains energized sources.

Each light source 9 is arranged to project two intense beams sideways through apertures or lenses 12. Each such beam is interrupted by the rotating reflecting surface 13 of a reflector R.

The reflecting surface 13 is composed of a deformable reflective colored material and the preferred material is metallized Melinex which is sold under the Registered Trade Mark Vapcolex. This material is highly reflective and is available in a number of different colors. The material is in the form of thin sheets resembling paper and may be crinkled by hand to produce randomly oriented reflecting surfaces. To produce the reflector R a sheet of this material or a composite sheet of different pieces of different color are crinkled as described and adhered to a circular disc 14 which acts as a base of the reflector. Natural or artificial jewels or sequins may be distributed on the Melinex to enhance the effect.

The base is provided with a hub 15 (FIG. 3) which is connected to the axle of a low wattage fractional horsepower electric motor 16. Each motor 16 is mounted by means of a sheet metal support 17 to the rear wall 5, preferably in such a manner that the angle of the assembly of motor and rotating reflector can be adjusted.

In the embodiment shown eight different rotating reflectors each with their own small motor are provided from four light sources 9, but it will be apparent that any suitable number may be used. The light sources and reflectors should be arranged so as not to interfere with the beam from the projector 2. The rotating reflectors are arranged so that the reflected images overlap in random fashion and where a different color is used in each reflector the effect produced on the screen 8 is of randomly moving intermingling projected shapes of different color.

It will be apparent that the angle of each of the axles of the motors 16 is so oriented that the reflected images from each light source are projected towards the screen 8. It is not necessary that the axles should be at right angles to the base plates 14 as shown, nor that these base plates should necessarily be flat as shown in FIG. 3. In fact it is preferred to deform the base plates out of the planar and with respect to the axles of the motors so that the various shapes are moved over the whole surface of the screen 8.

The angles of the various reflector axles are preferably randomized and the speeds of rotation may also be randomized. Adjustment is preferably made until an optimum effect is produced. The images from the rotating reflectors may be arranged to leave a central portion of the screen clear for the projector images, but this is not always necessary or desirable.

The reflecting surfaces 6 and 7 for the projector beam are preferably of the front silvered type, to avoid double reflection and it is preferred to use uncolored metallized Melinex for this purpose. This material again has the advantage that it is deformable and stretchable and as shown in FIG. 2 the reflecting surface 6 may be formed by applying a sheet of uncolored Vapcolex across the front of a loudspeaker cone 18. The surface 6 may in this way be made to vibrate or pulsate by the transmission of suitable signals to the loudspeaker.

It is not necessary to use two reflectors for the projector beam. The beam length may be adjusted to the cabinet in other ways, e.g. by the use of more reflectors or only one reflector.

FIG. 4 shows a light source 9' of the type used in FIG. 1 and a pair of rotating colored reflecting surfaces 13' arranged within a base drum so as to project the colored moving images on to the front skin of the drum or a substitute skin of screen material. The motor units for the rotating surfaces 13' are arranged in the same way as in FIGS. 1 and 3 and mounted on a transverse strut 19 which is fastened to the rear flange 20 of the drum.

The transformer 11' which as in the previous embodiment may be used to provide a low voltage from a main source for both the motors and the light sources 9 may be mounted also in the drum as shown.

The use of the device of the invention in the drum provides a striking effect in that the constantly changing images pulsate with beats of the drum.

It will be apparent that through the use of the colored reflecting material, the use of independent reflectors and colored filters is avoided. By using separate electric motors of a cheap variety for each rotating reflector, complex gearing is avoided. It is within the scope of the invention however to use a single motor for example for two or more reflectors which may be mounted on a common axle.

Many modifications of the device are possible. It is not necessary that the rotating reflectors be arranged inside a cabinet for reflection on to the rear surface of a translucent screen. In certain cases, e.g. in a theater they may be projected from the front side of the screen. Changing images on theater curtains or stage properties may be produced in this way. The device can also be used in the theater from behind the screen to produce changing patterns on a backdrop.

The device can also be arranged for outdoor use, for example, the housing may be rendered waterproof if necessary and mounted outside a building such as a theater. Alternatively the device may be arranged for projection on to the faces of buildings. Shop fronts, advertisement hoardings and petrol pump signs may be provided with special screen illuminated, in accordance with the invention, from within.

An interesting modification of reflector construction is to adhere deformable reflecting material, partly or wholly colored, on to an inflatable support such as a bladder, the bladder being attached, for example, to a rigid support as illustrated which may, but need not, rotate as illustrated or move otherwise itself. The bladder is fed with compressed air (or other gas or a liquid) which is caused to vary in inflating pressure e.g. by modulating a supply pump for the fluid. This makes the deformed reflecting surface vibrate, e.g. with a slow pulse beat. The reflector or its reflecting surface, or part thereof, may be made to suffer periodic movement in other ways, e.g. by mechanical means. The motion may be one of expansion and contraction or one of pulsation or vibration.

In FIG. 5 there is shown a reflector arranged in this way, the deformable reflecting material 13 being attached to a stretchable rubber sheet 30 bonded at its edge to the base 14 driven and supported as shown in FIG. 3. The axle is formed with a bore 31 communicating with the spacer 37 between the sheet 30 and the base and connected to an air pipe 32 via a bearing valve 33 having an annular cavity 34 into which the bore 31 opens and which connects with pipe 32. The pipe 32 is connected to a pump 35 driven by an electric motor 36, a modulator 37 being connected in the electric supply to the motor to cause the current to fluctuate to vary periodically the degree of inflation of the space 37 and therefore the area and deformity of the sheet 30.

The possible variations in projector assembly and arrangement are very numerous. The programming of an array or battery of projections which may include both cinematograph and still projectors is within the competence of those skilled in the art. Such arrays may be used in apparatus of the invention and programmed, e.g. by magnetic tape to operate to give selective shots of letters, numbers or pictures in sequence individually or in groups in the same area or in different parts of the screen and other effects such as spots of light, faded in an out, and sound effects of various kinds, may be added to the cumulative effect. Several projectors may be used so that the images overlap to increase the picture area. Some of the projectors may be stopped for various periods, such as when a sequence of letters is selected cumulatively to display a message.

The colored effect may be halted. For example the colored effect may be arranged to allow movement to be brought to a standstill by an operator when a particularly attractive effect is on the screen. By this means the apparatus may be used simply for artistic effect or interior decoration in the home or an office or show room. Abstract designs may be changed at will from an almost infinite selection.

I claim:

1. A device for creating a continuously moving and changing visual image comprising
   a support having a wall comprised of a translucent screen,
   a stationary light source on said support,
   a plurality of reflectors arranged on said support in laterally spaced relation to reflect light from the source onto the screen,
   said reflectors each comprising
      a disc having thereon a reflective surface comprised of deformed metallized plastic material of different colors and having randomly oriented reflective surfaces,
   the light source being positioned generally intermediate the reflectors and having means to direct cones of light in different directions upon each reflector, and being out of the optical path from the reflectors to the screen,
   and means for rotating said reflectors.

2. The combination claimed in claim 1, said reflectors light source and screen being arranged so that the reflections at least partly overlap on the screen.

3. A device for projecting a continuously moving and changing visual image onto a screen comprising,
   a stationary light source,
   a reflector arranged to reflect light from the source onto the screen, said reflector comprising
      an inflatable support having thereon randomly oriented reflecting deformable metallized plastic material,
   means for rotating said support,
   and means for varying the degree of inflation of said support whereby to cause variations in the area an deformity of the reflecting material.